May 12, 1959 J. BRASTY 2,885,710
SPRING FOR WINDSHIELD WIPER ARMS
Filed Jan. 23, 1957

INVENTOR.
JOSEPH BRASTY
BY Oldham & Oldham
ATTYS.

United States Patent Office 2,885,710
Patented May 12, 1959

2,885,710
SPRING FOR WINDSHIELD WIPER ARMS

Joseph Brasty, Maple Heights, Ohio

Application January 23, 1957, Serial No. 635,846

4 Claims. (Cl. 15—255)

This invention relates to special types of springs, especially to one designed for use with a windshield wiper arm for improving the efficiency and action thereof.

In windshield wiper arms as made for some time, there has been some type of a support base, or member provided which is adapted to engage with an operative, or drive shaft which extends through the cowl or equivalent portion of an automobile frame and engages the windshield wiper arms for controlling the reciprocating arcuate movement thereof. The windshield wiper arm extends from this support base and has some type of a spring member provided therein to urge the radially outer end of the windshield wiper support arm against a windshield or other supporting surface. Naturally, the windshield wiper arm supports a suitable windshield wiper blade at its outer end. The inherent resiliency provided by the connection between the support for the windshield wiper arm and the arm itself forces the windshield wiper blade against a windshield surface to aid in providing effective wiping action as the windshield wiper arm is reciprocated by the control shaft provided therefor.

Heretofore, when these springs providing resilient mounting for the windshield wiper support arms have become slightly sprung or otherwise lose their resiliency, less force is exerted by such support arm through the windshield wiper blade and a poor or unsatisfactory wiping job is done. In many instances, the spring tension means provided in the windshield wiper arm have failed completely. Thus, it is necessary to buy or replace the entire windshield wiper arm assembly and this is a relatively costly item. It may even be necessary, in some instances, to buy these windshield wiper support blades in sets of two even though only one of them has failed. This is objectionable as the other windshield wiper blade may still be in excellent form and be ready to give many satisfactory hours of service.

The general object of the present invention is to provide a novel and improved spring member for use with articles, such as windshield wiper arms, to provide an external or auxiliary member to give the windshield wiper blade assembly sufficient force for urging the wiper blade against the windshield surface for satisfactory cleaning action.

Another object of the invention is to provide a spring having offset hook ends thereon for engaging longitudinally spaced portions of a windshield wiper assembly without interfering with the operation thereof, but to improve the functioning thereof.

Another object of the invention is to provide a separate spring member having a novel type of hook means at opposite ends thereof for engaging proper surfaces of a windshield wiper support base and wiper arm to provide desired operative forces on the windshield wiper blade.

Yet other objects of the invention are to make the special auxiliary spring of the invention from spring wire so that it has inherent resiliency therein, or to make such spring member from a unit having coil spring means formed integrally therewith to aid in providing the desired resilient force required in the spring assembly.

The foregoing and other objects and advantages of the invention will be made more apparent as the specification proceeds.

For a better understanding of the invention, reference now should be had to the accompanying drawings wherein the details of the invention are shown, and wherein.

When referring to corresponding parts shown in the drawings and referred to in the specification, corresponding numerals are used to facilitate comparison therebetween.

Figure 1:
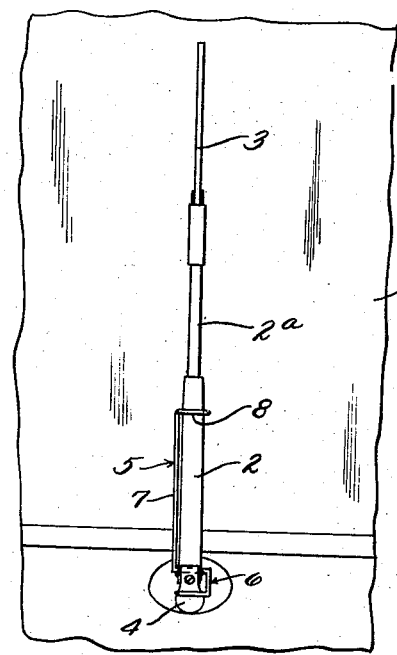
Fig. 1 is an elevation of a windshield wiper support arm and assembly having an auxiliary spring member of the invention associated therewith and wherein the principles of the invention are shown.

The present invention in general relates to a spring for engaging an article such as a windshield wiper support arm and wherein the spring comprises a generally U-shaped hook section that is so shaped and positioned in the spring as to be open at a side of the spring and be adapted to engage a base part of a wiper arm on the top and bottom surfaces thereof, the spring also having a body portion for extending along a wiper arm and a section extending upwardly for contact with the side of the wiper arm to aid in holding the spring on the wiper arm in operative engagement therewith, and an upwardly extending, downwardly open, offset hook shaped outer end section for engaging the top portion of the wiper arm to urge it to move inwardly in an arc about the base of the wiper arm and exert increased pressure on any supporting article. The invention also relates to the combination of this spring with a windshield wiper assembly for increasing the tensional forces exerted thereby.

In order to understand the present invention more completely, reference should be had to the details of the structure shown in the drawings. Thus, a windshield 1 of the vehicle is indicated and this windshield has a conventional windshield wiper arm 2 associated therewith and positioning a windshield wiper blade 3 in engagement with the windshield 1. The wiper arm 2 has an extension arm 2a usually positioned thereby. As is conventional in wiper arms of this type, a support base or member 4 is provided that engages with the control shaft for reciprocating the wiper arm 2 and which support base 4 or member is pivotally connected to the wiper arm 2 but with spring means (not shown) normally being associated with the wiper arm and support base 4 to urge the wiper arm inwardly against the windshield 1 for exerting desired forces thereagainst. However, in use, frequently this spring member either fails completely or else partially, so that the wiper arm 2 is either not pressed against the windshield 1 with any force or with insufficient force for desired satisfactory operation thereof.

Figure 2:
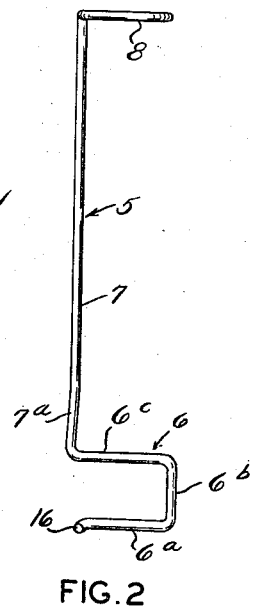
Fig. 2 is a plan of the spring member of Fig. 1.
Figure 3:
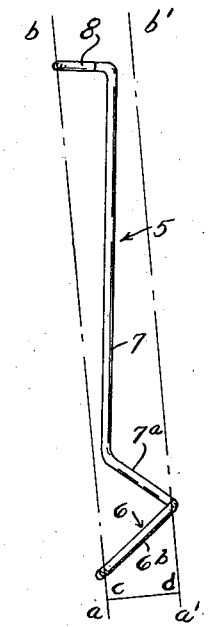
Fig. 3 is a right side elevation of the spring member of Fig. 2.

A novel spring member of the invention is indicated as a whole by the numeral 5. This spring 5, as best shown in Figs. 2 and 3, has a generally U-shaped hook section 6, which hook section 6 has a top arm, or leg 6a, a leg or bight 6b extending along one side of the support base 4, and a bottom leg arm, or 6c normally engaging and extending across the lower surface of the support base 4. These top and bottom legs 6a and 6c of the spring 5 are adapted to engage with longitudinally spaced portions of the support base 4, as indicated in Fig. 1 of the drawings. This aids in providing desired operative engagement therebetween. One end 16 of the top arm or leg 6a is outwardly flared to aid in engaging the hook section 6 with the base 4 of the wiper arm 2.

A body portion 7 is provided in the spring 5 to connect to and extend from this U-shaped hook section 6. The body portion 7 includes a length or section 7a in this body portion 7 that extends upwardly of the wiper arm 2 to insure that the spring 5 not only will engage with spaced top and bottom portions of the wiper arm assembly, but will also engage with opposed lateral margins thereof and prevent the spring from falling off the wiper arm. Thus the base or bight portion 6b of the hook section 6 and the length 7a of the body portion 7 engage opposite sides of the wiper arm 2 when engaged therewith. This aids in maintaining the spring in desired operative position.

The last portion of the spring 5 comprises an upwardly extending, downwardly open, offset, hook shaped end 8 wherein, in this instance, usually the hook is of a semicircular, or arcuate shape. This hook shaped end, as indicated in Fig. 1 of the drawings, engages the wiper arm 2 spaced from the base portion thereof and it exerts a compressive force on the arm to force it inwardly towards the windshield 1. By proper selection in the physical characteristics of the spring wire from which the spring 5 is normally made, the desired compressive force can be set up thereby on the wiper blade 3 to give improved functioning thereof. Obviously only a minimum amount of force is supplied by the spring 5 as to avoid any application of excessive pressures on the wiper arm 2 and blade 3 so as to prevent operation thereof by the normal operative control shaft (not shown) that connects to the support base 4 and rotates the wiper arm assembly.

Figure 4:
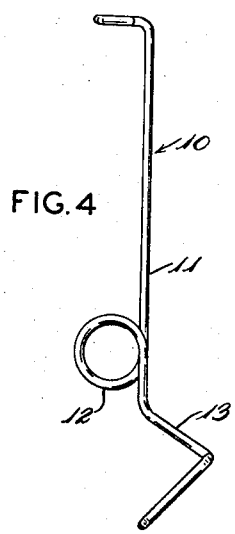
Figs. 4 and 5 are right side elevations of other modifications of the spring member of the invention.

Fig. 4 shows a modified spring of the invention, which spring is indicated as a whole by the numeral 10. In this instance, the spring 10 has a body portion 11 provided therein, which extends between and connects the hook shaped end sections of the spring, but with this body portion having one convolution of a coil spring 12 formed therein. This convolution 12 is so arranged so as to extend in a direction along the axis of the spring 10 and body portion 11 therein. If desired, in some instances, the offset or upwardly extending length indicated at 13 in this spring 10 could be eliminated and the body portion 11 could directly extend between the ends of the hook shaped sections of the spring assembly as the convolution 12 would give good engagement with the side portion of a wiper arm when operatively engaged therewith. Otherwise the spring 10 is made like the spring 5.

Figure 5:
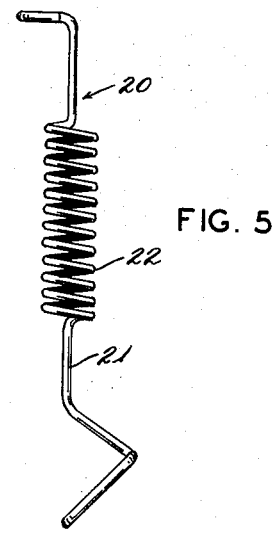

Yet another style of a spring is indicated at 20 in Fig. 5 of the drawings. In this instance, a body portion 21 is provided for connecting the hook shaped end portions of the spring together and with such body portion 21 including a length of coil spring 22 therein. Again, this coil spring will normally engage the side portion of the wiper arm 2 when operatively engaged therewith so that the body portion may extend directly between the hook shaped end portions, if desired.

From the foregoing, it will be seen that a novel spring has been provided by the invention and that such spring has a special shape with a base end hook being provided thereon which is open at the side of the spring and is adapted to engage with one side portion and longitudinally spaced top and bottom portions of a wiper arm base, or equivalent member, whereas the hook shaped end at the opposite end of the spring extends normally from a connecting body portion provided in the spring and with such hook shaped end 8 being downwardly open and of generally arcuate shape although other shapes may be used, as desired. Such hook shaped end 8 extends across a wiper arm when operatively engaged therewith and the hooks at the opposite ends of the spring are so arranged as to urge the wiper arm 2 in towards the windshield 1 when engaging both the support base 4 and the wiper arm 2, as described.

It should be noted that Fig. 3 shows two parallel center lines a—b and a'—b' in order to indicate a slightly different consideration of the spring 5 of the invention. This spring 5 is particularly adapted to fit onto some type of a wiper arm support base 4 or other member having substantially the effective height of approximately the lines c—d as indicated in Fig. 3. The hook shaped section 6 may lie at any desired angle to the axis a—b and even be normal thereto, if desired. Thus the term "effective height" relates to the hook section 6 to show the height of a member with which the spring most effectively engages. By providing the section 7a in the spring, a portion is provided for extending up along the side of the wiper arm member 2 and this aids in retaining the spring in engagement with the wiper arm assembly. It will be realized that the top of the hook shaped end 8 must be on the line a—b so that the spring can be properly engaged with a wiper arm. The provision of the section 7a in the arm adapts it for engagement with wiper base members 4 of different heights from that shown inasmuch as the inherent resiliency of the wire forming the spring members of the invention and/or the constructional shapes of the springs of the invention will permit the springs to adjust for slight differences in height and shapes of the members being engaged by the spring 5 and the hook section 6 thereof and still to engage tightly therewith. It will be realized that the longitudinal axis of the wiper support arm 2 will be parallel, in general, to the axis line a—b shown in Fig. 3 of the drawings.

The springs of the invention can be made at low cost and yet provide desirable, attractive finishes thereon if, for example, they are made from stainless steel wire. These springs will give wiper arms and windshield wiper blades more effective, or increased service life and will avoid replacement of the entire windshield arm assembly, as is done at the present time in many instances, on failure of the spring means therein.

Thus it is believed that the objects of the invention have been achieved.

While several complete embodiments of the invention have been disclosed herein, it will be appreciated that modification of these particular embodiments of the invention may be resorted to without departing from the scope of the invention as defined in the appended claims.

What I claim is:

1. A spring for engaging a windshield wiper support arm or the like and comprising a generally U-shaped hook section so positioned in the spring as to be open at the side thereof for engaging a base part of a wiper arm on the top and bottom surfaces thereof and extend transversely thereof at longitudinally spaced parts of such base part, said hook section including laterally extending top and bottom arms connected by a bight portion, said bight portion of said hook section being adapted to engage a side of said base part, one end of said hook section being outwardly flared to aid in engaging it with such wiper arm base part, a body portion connected to the other end of said hook section and having a section extending upwardly for contact with the side of a wiper arm opposite to the side of said base part contacted by said bight; and a downwardly open offset hook shaped end for engaging the top portion and opposite side of a wiper arm to urge it to move inwardly in an arc about the base of said wiper arm and exert increased pressure on a supporting article for said wiper arm.

2. A spring for engaging a windshield wiper support arm or the like and comprising a generally U-shaped hook section open at the side thereof and having substantially straight top, bottom and bight portions of an effective length for engaging and extending transversely of a base part of a wiper arm on longitudinally spaced portions of the top and bottom surfaces thereof, a resilient body portion connected to said hook section to extend along and engage the side of a wiper arm opposite to the side of said base part engaged by said bight, and a downwardly open hook shaped end of a size and width for engaging the top and opposite side portion of said wiper arm to urge it to move inwardly in an arc about the base of any wiper arm with which it is engaged, said hook shaped end being spaced longitudinally of said wiper arm from said hook section, the upper portions of said hook section and hook shaped end defining a line adapted to be parallel with the longitudinal axis of any wiper arm with which the spring is engaged.

3. A combination as in claim 2 wherein said body portion extends longitudinally of the spring and has a longitudinally directed convolution therein to provide resiliency in said spring and to bear against the side of any wiper arm with which said spring is engaged.

4. A combination as in claim 2 wherein said body portion has a length of longitudinally extending coil spring included therein to provide resiliency in the longitudinal axis in said spring.

References Cited in the file of this patent

UNITED STATES PATENTS

| | | |
|---|---|---|
| 1,451,698 | Kelber | Apr. 17, 1923 |
| 1,783,582 | Oishei et al. | Dec. 2, 1930 |
| 1,888,665 | Herlbauer et al. | Nov. 22, 1932 |
| 2,481,192 | Borsuk | Sept. 6, 1949 |
| 2,660,748 | Gaumer | Dec. 1, 1953 |